(12) United States Patent
Sheafer et al.

(10) Patent No.: US 9,772,996 B2
(45) Date of Patent: Sep. 26, 2017

(54) METHOD AND SYSTEM FOR APPLYING ROLE BASED ASSOCIATION TO ENTITIES IN TEXTUAL DOCUMENTS

(71) Applicant: Yissum Research Development Company of The Hebrew University of Jerusalem Ltd., Jerusalem (IL)

(72) Inventors: Tamir Sheafer, Givatayim (IL); Shaul Shenhav, Jerusalem (IL); Yair Fogel-Dror, Mevaseret Tzion (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 0 days.

(21) Appl. No.: 15/226,967

(22) Filed: Aug. 3, 2016

(65) Prior Publication Data

US 2017/0039185 A1 Feb. 9, 2017

Related U.S. Application Data

(60) Provisional application No. 62/200,723, filed on Aug. 4, 2015.

(51) Int. Cl.
*G06F 17/27* (2006.01)

(52) U.S. Cl.
CPC ........ *G06F 17/2785* (2013.01); *G06F 17/271* (2013.01); *G06F 17/278* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 9,336,192 B1 *   5/2016  Barba .................. G06F 17/277
2011/0137906 A1 * 6/2011  Cai ..................... G06F 17/2785
                                                      707/740

(Continued)

OTHER PUBLICATIONS

Wouter et al., analysis: using syntactic information to enrich frequency-based automatic content analysis, Jul. 2015, Symposium New Frontiers of Automated Content Analysis in the Social Sciences, pp. 1-17.*

(Continued)

*Primary Examiner* — Lamont Spooner
(74) *Attorney, Agent, or Firm* — Pearl Cohen Zedek Latzer Baratz LLP

(57) ABSTRACT

A method and a system for identifying indication for activity in a topic or a sentiment associated to, of an entity in a textual document are provided herein. The method may include the following stages: obtaining a plurality of textual documents describing a plurality of entities; identifying a relationship between entities and verbs at least on a sentence level, based on a semantic analysis of the verbs; determining at least one of: a topic, and a sentiment associated to the verbs identified in textual documents; and using the identified relationship between entities and verbs and a respective determined topic or sentiment associated with the verbs to determine for each of the plurality of entities: a sentiment level associated thereto, and a level of activity at the at least one topic associated thereto.

15 Claims, 4 Drawing Sheets

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................................. 704/1, 9, 10
See application file for complete search history.

(56) References Cited

U.S. PATENT DOCUMENTS

| | | | | |
|---|---|---|---|---|
| 2012/0158726 | A1* | 6/2012 | Musgrove | G06F 17/30707 707/737 |
| 2012/0166180 | A1* | 6/2012 | Au | G06F 17/274 704/9 |
| 2013/0159277 | A1* | 6/2013 | Liu | G06F 17/271 707/709 |
| 2013/0231920 | A1* | 9/2013 | Mathew | G06F 17/30705 704/9 |
| 2014/0067375 | A1* | 3/2014 | Wooters | G06F 17/28 704/9 |

OTHER PUBLICATIONS

Godbole, Large-Scale Sentiment Analysis for News and Blogs, 2007, ICWSM, vol. 7, No. 21, pp. 1-4.*
Wouter, Automatically extracting frames from media content using syntacting analysis, 2013, Proceedings of the 5th Annual ACM Web Science Conference, ACM, pp. 423-430.*

* cited by examiner

METHOD AND SYSTEM FOR APPLYING ROLE BASED ASSOCIATION TO ENTITIES IN TEXTUAL DOCUMENTS

CROSS-REFERENCE TO RELATED APPLICATIONS

This application claims priority of U.S. Provisional Patent Application No. 62/200,723, filed Aug. 4, 2015, which is hereby incorporated by reference.

FIELD OF THE INVENTION

The present invention relates generally to processing textual documents and more particularly, to a deriving an association between a sentiment associated by the author to the various entities presented in the documents.

BACKGROUND OF THE INVENTION

Prior to the background of the invention being set forth, it may be helpful to set forth definitions of certain terms that will be used hereinafter.

The term "sentiment analysis" as used herein is defined as the use of natural language processing, text analysis and computational linguistics to identify the attitude, opinions and/or emotions that an author of a text expresses regarding specific entities or subjects.

The term "sentiment-entity association" as used herein is referred to the process of associating a sentiment to an entity that is presented in a text. In case of a plurality of entities, the sentiment-entity association process will associate a sentiment with its corresponding entity.

The sentiment, the "tone" of political discourse, can be almost as influential as the substantive content of the text. The basic question asked in this context is whether the author describes the target of the text in a good, bad or neutral way. Some known solutions of addressing the sentiment-entity association challenge in a political discourse tend to use a proximity measure. One approach, common in online systems, uses the co-occurrence of the sentiment expression and an entity mentioned in the same sentence as a sufficient cue for associating them. Yet, even the sentence level of analysis might be too broad, as some sentences refer to more than one entity; hence further narrowing of the level of analysis might be preferred.

It would be advantageous to be able to associate sentiment to entities presented in a text in a more structured manner that will increase the correctness of the association.

In some cases, the sentiment is difficult to be assessed. This may happen when the opinion of the reader further affect the way an entity is being judged. The author may present an entity by providing his or her opinion in regards to the outcome of an entity's deeds, but the specific outcome can be appreciated differently by two different readers.

Therefore, it would be further advantageous to find another indicator for evaluating entities in a text that is less prone to reader or author perspective.

SUMMARY OF THE INVENTION

According to one aspect of the present invention, the sentiment-entity association process is enhanced by using semantic data which facilitate the understating of the entity's role in the sentence.

According to another aspect of the present invention, a level of activity of each entity in any of the topics described in the text is also being identified. By doing so, a novel indicator, Activity of an Actor In a Topic (AAIT), which may be more robust and tolerant to readers' or authors' views, is provided According to some embodiments of the present invention, a method for identifying indication for activity in a topic or a sentiment associated to, of an entity in a textual document is provided herein. The method may include the following stages: obtaining a plurality of textual documents describing a plurality of entities operating in at least one topic; identifying a relationship between entities and verbs at least on a sentence level, based on a semantic analysis of the verbs; determining at least one of: a topic, and a sentiment associated to the verbs identified in textual documents; and using the identified relationship between entities and verbs and a respective determined topic or sentiment associated with the verbs to determine for each of the plurality of entities: a sentiment level associated thereto, and a level of activity at the at least one topic associated thereto.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
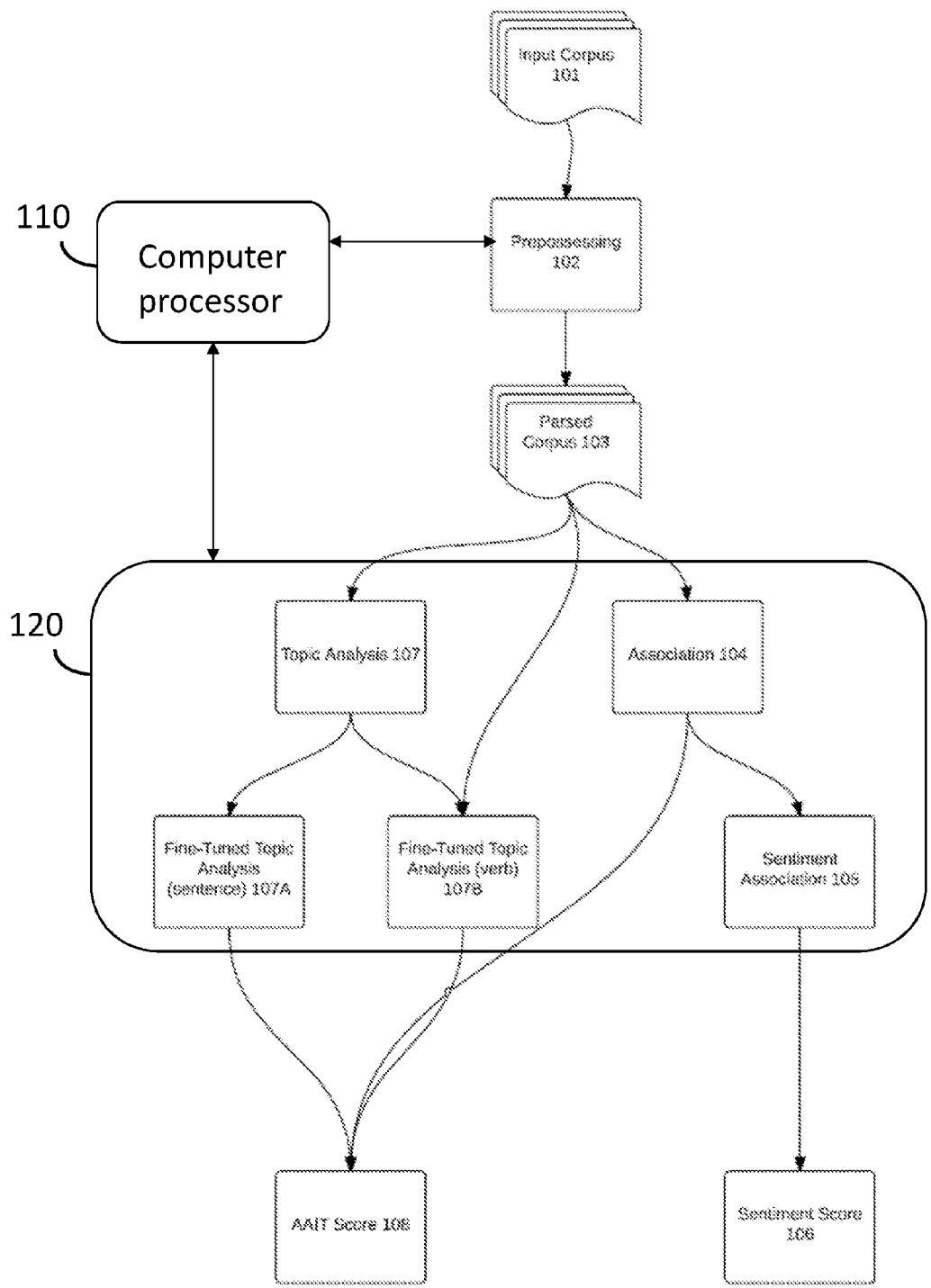
FIG. 1 is a schematic block diagram illustrating a process according to some embodiments of the present invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

For addressing the challenge of assessing sentiment of entities in documental texts, the inventors have used an attribute of political discourse being a high proportion of sentences that contain references to multiple entities, many times as a result of interactions between them. This attribute makes the sentence-proximity method less accurate, since the sentiment of the expression will be unintentionally attributed to all actors (usually this is not intended by the author).

Even methods utilizing a higher resolution known in the art, such as the 10-words-proximity method, may not always be sufficiently effective in assessing sentiment. For example, a given text describes how "Israel attacked Hamas" or "Hamas was attacked by Israel". The author may intend to portray Israel as an actor that acts aggressively, and, therefore, it is associated with a negative sentiment. The sentiment should only be associated with Israel as the agent of the action. However, current proximity methods would wrongly associate the sentiment with Hamas as well.

Furthermore, this attack can be described in the text in a slightly different way, such as "Hamas accuses Israel of attacking it". In this example, the accusation is meant to address a negative sentiment towards Israel as the aggressor. As the distance of both entities from the sentiment expression is identical in each case, proximity methods would associate the sentiment with both entities instead of just one. The result would be false classifications of specific expressions and a more symmetric sentiment score for both entities in the document.

Some embodiments of the present invention aim to solve this problem. To achieve this, some embodiments of the present invention utilize a logic that resembles the task of semantic role labeling, where two major roles, the proto-agent and the proto-patient of the action, are considered.

The focus according to some embodiments of the present invention, however, is less about the semantic roles per se, but rather on the sentiment evoked toward the entities. In the example above, Israel is presented with a negative sentiment in all three cases, assuming this attack carries a negative sentiment. In the first two cases ("Israel attacked Hamas"; "Hamas was attacked by Israel"), Israel serves as the agent of the aggressive action, and, therefore, the negative sentiment is safely associated with it. However, in the third case, where Hamas directly refers to Israel by accusing it, Israel serves as the patient of the accusation. This last case is usually interpreted as a judgment frame, where the agent is the judge, or as a quote, where the referring entity is the source. Either way, the agent in the cases of direct referencing says something negative or positive regarding the patient, and, therefore, the sentiment should be associated with the patient.

Consequently, associations made by some embodiments of the present invention are more accurate, even at the level of a single sentiment expression, and suffer less from false positives and artificially symmetrical scores in document-level analysis.

Some embodiments of the present invention assign each sentiment verb expression to a specific entity. An empirical demonstration carried out by the inventors was based, by way of illustration, on news coverage of the Israeli-Palestinian conflict. In this empirical demonstration, each sentiment verb expression is classified into one of four categories, according to the entities it targets: Israel, the Palestinian Authority (PA), both, or neither. In line with methods for semantic role labeling, the method in accordance to some embodiments of the present invention begins by splitting sentences into clauses. It then identifies the entities mentioned in subjects and objects, including coreference resolution, and distinguishes between passive and active voices of the verb. Political entities of interest—Israel and the PA—were identified using a manually-built keyword dictionary. Tagging of sentiment expressions was performed using the Lexicoder Sentiment Dictionary. Lastly, cases of direct referencing were identified based on the Wordnet lexical group (super-sense) classification of the verbs.

Essentially, the method in accordance with some embodiments of the present invention uses four features: (1) entities identified in the subject of the clause in which the verb was found; (2) entities identified in the predicate of the clause; (3) the voice of the verb; and (4) in order to identify cases of direct referencing, a dichotomous flag indicating whether the Wordnet lexical group of the verb was communication, which mostly includes direct referencing verbs, and also most of the direct referencing verbs are included in it.

FIG. 1 is a high level block diagram illustrating the processing flow of the data in a system in accordance with some embodiments of the present invention implemented by a non-transitory computer readable medium 120 (e.g., a computer memory) executed by a computer processor 110. A corpus of documents 101 is pre-processed using several generic methods 102 executed by computer processor 110, ended as a parsed corpus 103. The parsed corpus is then processed using a learning algorithm for association 104 referred herein as a role-based association method, which is used for the sentiment association 105, resulted in an associated sentiment score for each entity 106. Combined with a topic analysis method 107 (or its fine-tuned version methods 107A and 107B), the role-based association method 104 is also used in order to associate the activity in the topic with the relevant entity, resulted in the AAIT score 108 (described below).

Figure 2:
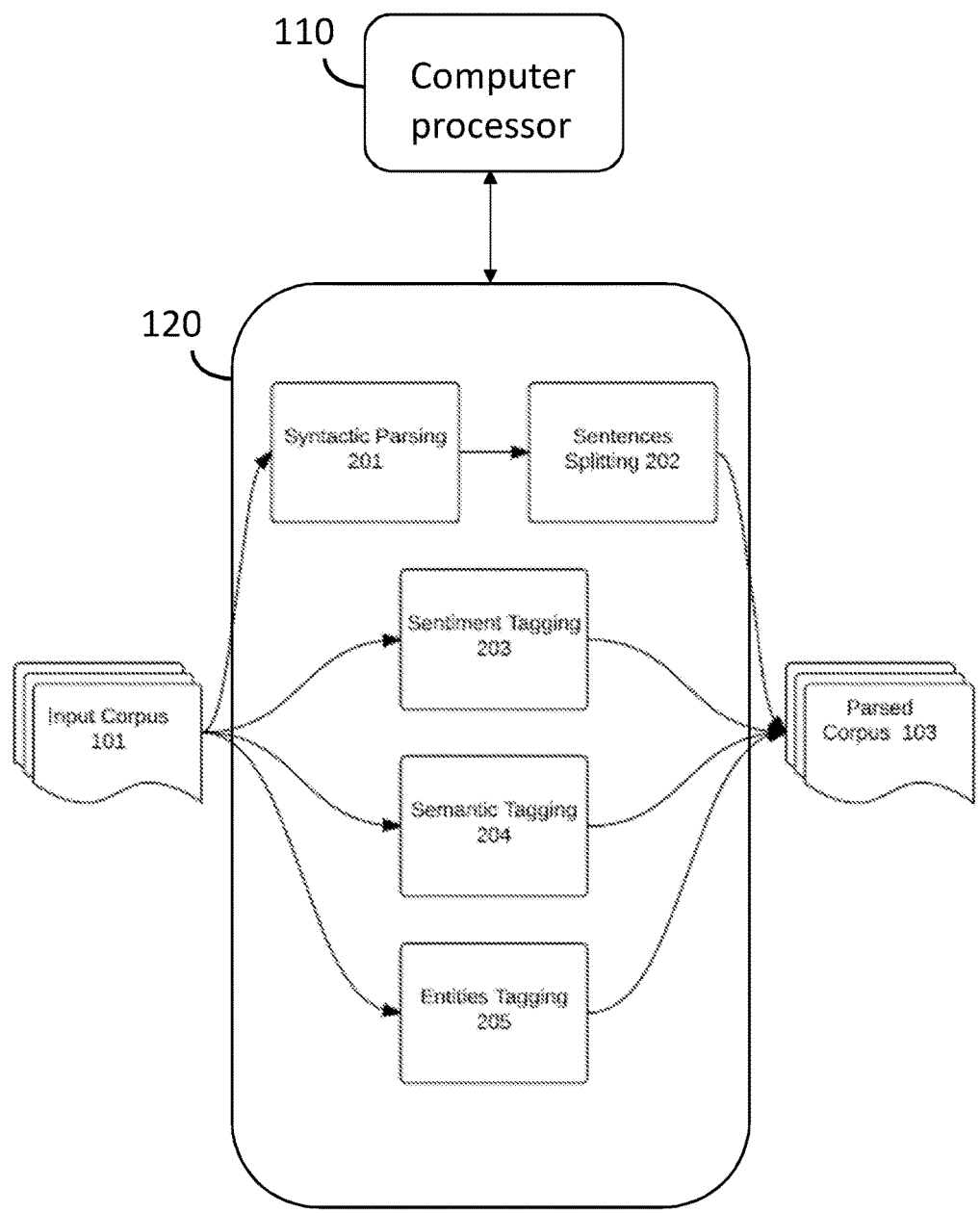
FIG. 2 is schematic diagram illustrating a an aspect according to some embodiments of the present invention.

The preprocessing phase illustrated in a high level block diagram in FIG. 2 includes several generic methods implemented in accordance with some embodiments of the present invention by a non-transitory computer readable medium 120 executed by a computer processor 110. Method 201 contains a standard syntactic parsing (lemmatization, POS tagging, dependencies parsing, coreference resolution, etc.) and is followed by a splitting method 202 in order to split complex sentences into clauses. The text is also tagged using a sentiment analysis method 203 where we are specifically interested in tagging verbs (e.g., positive and negative actions) which are also tagged using a semantic dictionary 204 (e.g., Wordnet super-senses) in order to get their general type. Last, references for entities are tagged using a similar method 205 (e.g., names of states, parties, politicians).

Tagging verbs with a sentiment analysis method can also be implemented in some embodiments of the present invention using a trained learning algorithm for sentiment analysis of verbs, in specific, or a sequence of words that includes the verb (e.g., a clause or the entire sentence). If a sequence of words is tagged, than all the verbs that are included in the sequence, may carry the sentiment of the sequence for the purpose of the association.

Figure 3:
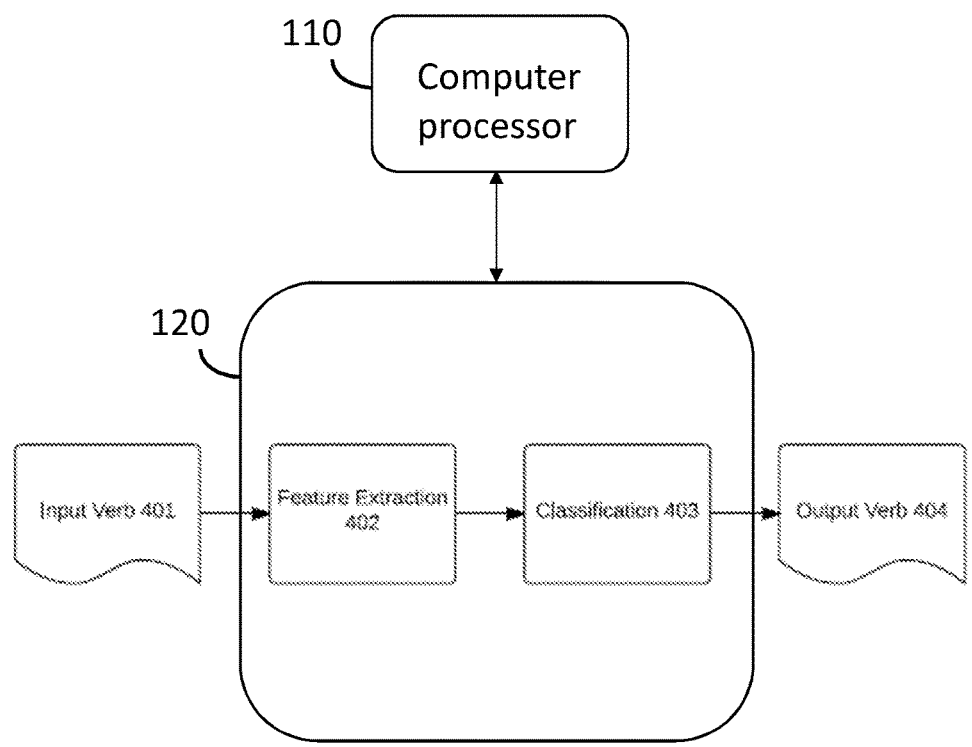
FIG. 3 is schematic block diagram illustrating another aspect according to some embodiments of the present invention.

FIG. 3 illustrates role-based association method 104 in accordance with some embodiments of the present invention, implemented by a non-transitory computer readable medium 120 executed by a computer processor 110. It begins with a single verb 401 as an input and continues with a feature extraction method 402. For each verb, four features may be extracted: entities identified in the subject of the clause containing the verb, entities identified in the predicate of the clause containing the verb, the voice of the verb (active or passive) and the semantic type (e.g., Wordnet super-sense or lexical group) which is translated into a binary flag indicating whether the verb is a direct referencing type (e.g., the communication super-sense in Wordnet). These features are used in a trained learning algorithm for classification 403 (e.g., a decision tree or SVM). The output 404 is a verb, classified into the group of verbs that are to be associated with a specific entity (or a group of entities).

After all the verbs, and specifically the verbs which are also tagged with a sentiment score, are classified, the sentiment is associated with each entity 105. For each entity, sentiment scores from all verbs that are tagged as associated with this entity are summed up to create the entity's sentiment score 106.

One of the challenges of applying sentiment analysis to a text containing a political discourse, is taking into account the relation between the sentiment and the perspective. Not only that political discourse includes a contest over different perspectives, almost anything in the political domain is evaluated differently from different perspectives or ideologies. For example, consider a sentence describes a possible Israeli military attack on an Iranian nuclear facility. This sentence could be read as a positive description written from the Israeli PM Netanyahu's perspective or as a negative description written from the US President Obama's perspective. Another example can be a text describes a decision to open the Israel-Gaza barrier, or Israeli roadblocks in the west bank. This text will probably be viewed as positive from a dovish perspective or as negative from a hawkish perspective.

The indicator suggested by the inventors in accordance with some embodiments of the present invention, is referred to herein as the Actor Activity In a Topic (AAIT) and tackles two questions regarding the text: (1) what is happening? (e.g., "a violent conflict between Israel and Iran") and (2) what is the level of activity of each actor in this happening? (e.g., "Israel is active on an X level, Iran is active on a Y level"). At the end of the analysis, the researcher would be able to assess the level of activity of each actor in each topic. Then, it is for the researcher to decide whether an activity of a specific actor in a specific topic should be considered as a positive or negative image of this actor. By answering these questions only, the measure will not be able to exhaust the entire concept of evaluation, as we assume this is not fully feasible in political discourse. The new measure will only assist the researcher in the analysis process; nevertheless, it will result in a meaningful representation of what is being described in the text regarding the actor.

For the AAIT score to be calculated, a topic analysis method 106 (LDA's conventions will be used as follows, but any sort of topic analysis or topic modeling method might serve this purpose) is used on the corpus, at the document level, resulted in a distribution of topics ($\Theta_d$) for each text document d, probability of topic k occurring in document d ($\theta_{k,d}$) and probability of word w occurring in topic k ($\phi_{k,w}$). Optionally, in order for a higher resolution to be reached, an additional method for a method for fine-tuned topic analysis at the sentence level 107A is implemented. In yet another embodiment of fine-tuned topic analysis at the sentence level 107A may include training a supervised classifier directly on sentences, in order to identify the specific topic (or distribution of topics) represented in the entire sentence. This may lead to a quicker training period.

In accordance with some embodiments of the present invention, the process of topic analysis at the sentence level that is based on a topic modeling originally trained at the document level, is run for each sentence in separate, starting by calculating a score $P'_{k,w}$ to represent the approximated probability of each topic k occurring in sentence s using equation (1) as follows:

$$P'_{k,s} = \theta_{k,d} * \Sigma_{w\ in\ s} \phi_{k,w} \quad (1)$$

For each topic k in the distribution of topics $\Theta_d$, we get the approximated proportion of the topic in the sentence s ($P'_{k,s}$) by multiplying the proportion of the topic k in the article d ($\theta_{d,k}$) with the sum of relevant phi values for each word w in the sentence ($\phi_{k,w}$). When a fine tuning version of method 107 is not used, each sentence in the document will get the same distribution of topics as in the document as a whole ($\Theta_d$).

Another alternative for the topic analysis fine tuning is to create a topic tag for each verb in the text 107B. For that purpose, the topic k with highest probability of the word w to occur in topic k ($\phi_{k,w}$) can be chosen. Alternatively, a simple dictionary method can be used, where each verb is tagged with a specific predetermined topic. In the latter case, method 107 can be skipped, as each verb can be tagged for topics directly using the dictionary, without the need to create a topic model first using the whole corpus. The output of the topic analysis method 107, or one of its fine-tuned version 107A or 107B, is used in combination with the association method 104 in order to associate the activity in the topic with the relevant entity, resulted in the AAIT score 108. First, the associated entity of each verb resulted from method 104 is considered as the active entity in that verb. Second, when the topic k is tagged at the sentence level (methods 107 or 107A), each entity that was tagged as active in one of the verbs in the sentence, is tagged as an active entity in the topic k for this sentence. This results with the activity indicator $A_{e,s}$ where its value is 1 if entity e was marked as an active entity in sentence s, and 0 otherwise. After all sentences in the document are tagged using this method, the AAIT score can be calculated for each entity e in topic k ($AAIT_{k,e}$) as the sum of the approximated proportions of topic k in all sentences in the document d using equation (2) as follows:

$$AAIT_{k,e} = \Sigma_{s\ in\ d} P'_{k,s} * A_{e,s} \quad (2)$$

Otherwise, when the topic k is tagged directly for each verb, using method 107B, the entity that was tagged as active in that verb would be tagged as the active entity in the topic k. After tagging the active entities and topic for all verbs in the document, the $AAIT_{k,e}$ score can be calculated as a sum (or a weighted sum) of all relevant verbs.

Figure 4:
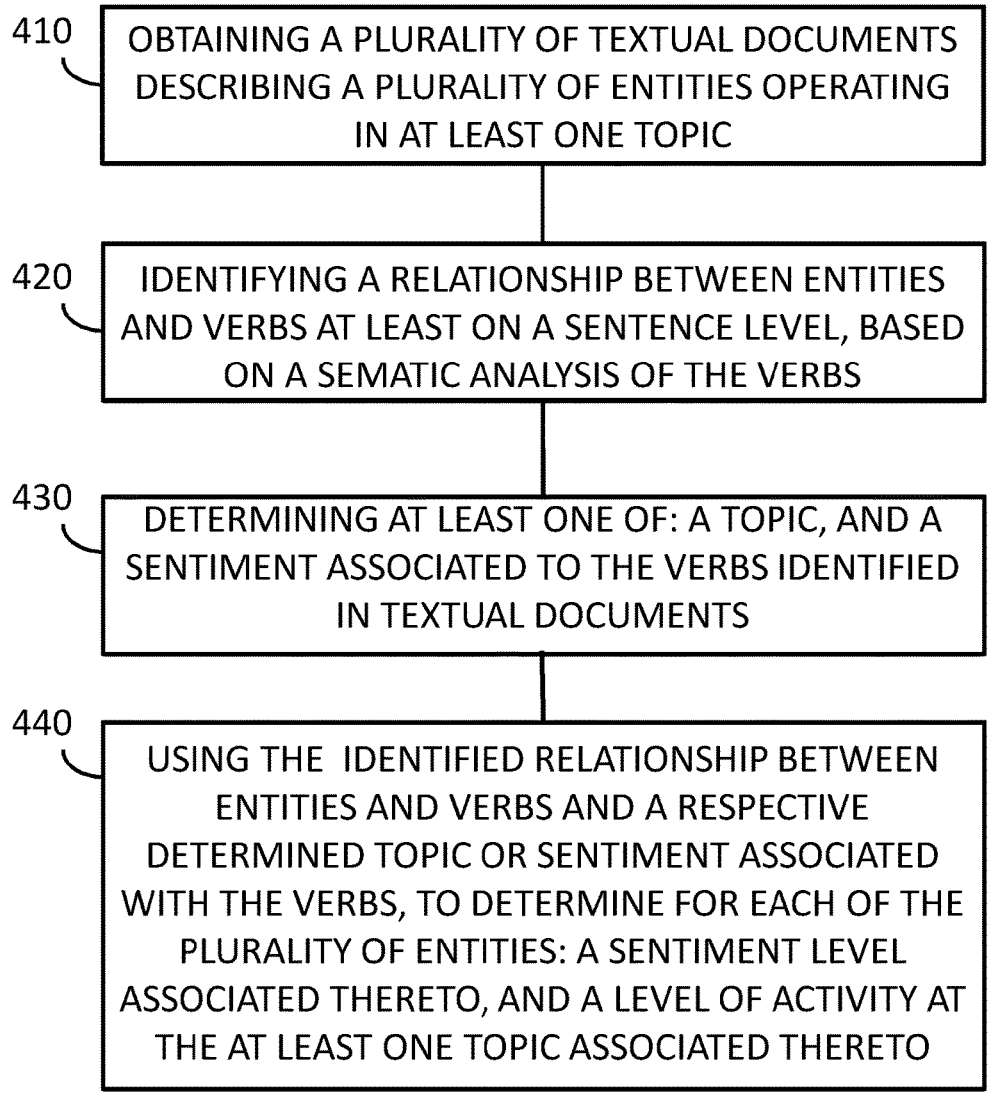
FIG. 4 is a high level flowchart illustrating a method in accordance with embodiments of the present invention.

FIG. 4 is a flowchart illustrating a method 400 implementing a generalized non-limiting embodiment of the aforementioned invention. Method 400 may include the following steps: obtaining a plurality of textual documents describing a plurality of entities operating in at least one topic 410; identifying a relationship between entities and verbs at least on a sentence level, based on a semantic analysis of the verbs 420; determining at least one of: a topic, and a sentiment associated to the verbs identified in textual documents. (Alternatively or additionally, the topic or sentiment can also be determined for sentences associated with said verbs) 430; and using the identified relationship between entities and verbs and a respective determined topic or sentiment associated with the verbs to determine for each of the plurality of entities: a sentiment level associated thereto, and a level of activity at the at least one topic associated thereto 440.

According to some embodiments of the present invention, the identifying of the relationship between entities and verbs may be carried out on a clause level, wherein each clause is identified as a part of a sentence that includes only one subject.

According to some embodiments of the present invention, the semantic analysis may include at least one of: identifying the entities mentioned in a subject related to the verb; identifying the entities mentioned in a predicate related to the verb; a voice of the verb, and a semantic type of the verb.

According to some embodiments of the present invention, the determining of a topic associated to the verbs identified in textual documents may be carried out using a dictionary or using a trained learning algorithm.

According to some embodiments of the present invention, the determining of a sentiment associated to the verbs identified in textual documents may be carried out using a dictionary or a trained learning algorithm.

According to some embodiments of the present invention, method 400 further includes the step of applying a probabilistic model of the topics presented in the textual documents while using the identified relationship between entities and verbs and a respective determined topic or sentiment associated with the verbs to determine for each of the plurality of entities: a sentiment level associated thereto, and a level of activity at the at least one topic associated thereto, taking into account the probability of each of the topic in a respective sentence.

According to some embodiments of the present invention, the probability of the topic in a respective sentence is calculated in view of the probability of other topics appearing in the textual documents.

According to some embodiments of the present invention, method 400 further includes the step of calculating a sentiment score for each of entities appearing in the textual documents.

According to some embodiments of the present invention, method 400 further includes the step of determining the level of activity of each entity in each of the topics appearing in the textual documents.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of applying role based association to entities in textual documents, the method comprising:

obtaining a plurality of textual documents describing a plurality of entities;

identifying a relationship between entities and verbs, at least on a sentence level, based on a semantic analysis of the verbs;

determining at least one of: a topic, and a sentiment associated to the verbs identified in said textual documents or to sentences associated with said verbs;

using the identified relationship between entities and verbs and a respective determined topic or sentiment associated with the verbs, to determine for each of the plurality of entities: a sentiment level associated thereto, and a level of activity at the at least one topic associated thereto;

applying a probabilistic model of the topics presented in the textual documents while using the identified relationship between entities and verbs and a respective determined topic or sentiment associated with the verbs to determine for each of the plurality of entities: a sentiment level associated thereto, and a level of activity at the at least one topic associated thereto, taking into account a probability of each of the topic in a respective sentence, wherein the probabilistic model at the sentence level is based on an approximated probability of for each of the topics occurring in each of the sentences, calculated based on a probability of each of the topics occurring in each of the textual documents and a probability of a word occurring in each of the topics, and wherein the level of activity for each entity in the at least one topic is calculated as a sum of the approximated proportions of all of the topics in all of the sentences in the textual documents using, whenever the entity is tagged as active.

2. The method according to claim 1, wherein the identifying of the relationship between entities and verbs is carried out on a clause level, wherein each clause is identified as a part of a sentence that includes only one subject.

3. The method according to claim 1, wherein the semantic analysis comprises at least one of: identifying the entities mentioned in a subject related to the verb; identifying the entities mentioned in a predicate related to the verb; a voice of the verb, and a semantic type of the verb.

4. The method according to claim 1, wherein the determining of a topic associated to the verbs identified in textual documents is carried out using a dictionary or a trained learning algorithm.

5. The method according to claim 1, wherein the determining a sentiment associated to the verbs identified in textual documents is carried out using a dictionary or a trained learning algorithm.

6. The method according to claim 1, wherein the probability of the topic in a respective sentence is calculated in view of the probability of other topics appearing in the textual documents.

7. The method according to claim 1, further comprising calculating a sentiment score for each of entities appearing in the textual documents.

8. The method according to claim 1, further comprising determining the level of activity of each entity in each of the topics appearing in the textual documents.

9. A method of applying role based association to entities in textual documents, the method comprising:

obtaining a plurality of textual documents describing a plurality of entities;

identifying a relationship between entities and verbs, at least on a sentence level, based on a semantic analysis of the verbs;

determining at least one of: a topic, and a sentiment associated to the verbs identified in said textual documents or to sentences associated with said verbs; and using the identified relationship between entities and verbs and a respective determined topic or sentiment associated with the verbs, to determine for each of the plurality of entities: a sentiment level associated thereto, and a level of activity at the at least one topic associated thereto;

applying a probabilistic model of the topics presented in the textual documents while using the identified relationship between entities and verbs and a respective determined topic or sentiment associated with the verbs to determine for each of the plurality of entities: a sentiment level associated thereto, and a level of activity at the at least one topic associated thereto, taking into account a probability of each of the topic in a respective sentence, wherein the probabilistic model at the sentence level is based on:

$$P'_{k,s} = \theta_{k,d} * \sum_{w \text{ in } s} \varphi_{k,w}$$

wherein $P'_{k,s}$ represents an approximated probability of each topic k occurring in sentence s, wherein $\theta_{k,d}$ denotes probability of topic k occurring in document d and wherein $\phi_{k,w}$ denotes a probability of word w occurring in topic k, wherein an Active Actor in Topic (AAIT) score is calculated for each entity e in topic k ($AAIT_{k,e}$) as a sum of the approximated proportions of topic k in all sentences in the document d using, where the entity is tagged as active so that:

$$AAIT_{k,e} = \sum_{s \text{ in } d} P'_{k,s} * A_{e,s}.$$

10. The method according to claim 9, wherein the determining of a topic associated to the verbs is carried out directly at the verb level and so the $AAIT_{k,e}$ score is calculated as a sum of all verbs associated with topic k where entity e is tagged as active.

11. A system for applying role based association to entities in textual documents, the system comprising:

a computer memory configured to obtain a plurality of textual documents describing a plurality of entities; and a computer processor configured to:

identify a relationship between entities and verbs, at least on a sentence level, based on a semantic analysis of the verbs;

determine at least one of: a topic, and a sentiment associated to the verbs identified in said textual documents, or to sentences associated with said verbs;

use the identified relationship between entities and verbs and a respective determined topic or sentiment associated with the verbs, to determine for each of the plurality of entities: a sentiment level associated thereto, and a level of activity at the at least one topic associated thereto; and apply a probabilistic model of the topics presented in the textual documents while using the identified relationship between entities and verbs and a respective determined topic or sentiment associated with the verbs to determine for each of the plurality of entities: a sentiment level associated thereto, and a level of activity at the at least one topic associated thereto, taking into account a probability of each of the topic in a respective sentence, wherein the probabilistic model at the sentence level is based on an approximated probability of for each of the topics occurring in each of the sentences, calculated based on a probability of each of the topics occurring in each of the textual documents and a probability of a word occurring in each of the topics, and wherein the level of activity for each entity in the at least one topic is calculated as a sum of the approximated proportions of all of the topics in all of the sentences in the textual documents using, whenever the entity is tagged as active.

12. The system according to claim 11, wherein the probability of the topic in a respective sentence is calculated in view of the probability of other topics appearing in the textual documents.

13. A method of applying role based association to entities in textual documents, the system comprising:
a computer memory configured to obtain a plurality of textual documents describing a plurality of entities; and
a compute processor configured to:
identify a relationship between entities and verbs, at least on a sentence level, based on a semantic analysis of the verbs;
determine at least one of: a topic, and a sentiment associated to the verbs identified in said textual documents or to sentences associated with said verbs;
use the identified relationship between entities and verbs and a respective determined topic or sentiment associated with the verbs, to determine for each of the plurality of entities: a sentiment level associated thereto, and a level of activity at the at least one topic associated thereto; and
apply a probabilistic model of the topics presented in the textual documents while using the identified relationship between entities and verbs and a respective determined topic or sentiment associated with the verbs to determine for each of the plurality of entities: a sentiment level associated thereto, and a level of activity at the at least one topic associated thereto, taking into account a probability of each of the topic in a respective sentence,
wherein the probabilistic model at the sentence level is based on:

$$P'_{k,s} = \theta_{k,d} * \sum_{w \text{ in } s} \varphi_{k,w}$$

wherein $P'_{k,s}$ represents an approximated probability of each topic k occurring in sentence s, wherein $\theta_{k,d}$ denotes probability of topic k occurring in document d and wherein $\varphi_{k,w}$ denotes a probability of word w occurring in topic k, wherein an Active Actor in Topic (AAIT) score is calculated for each entity e in topic k ($AAIT_{k,e}$) as a sum of the approximated proportions of topic k in all sentences in the document d using, where the entity was tagged as active so that an $A_{e,s}$ indicator equals to 1:

$$AAIT_{k,e} = \sum_{s \text{ in } d} P'_{k,s} * A_{e,s}.$$

14. A non-transitory computer readable medium comprising a set of instructions that when executed cause at least one processor to:
obtain a plurality of textual documents describing a plurality of entities; and
identify a relationship between entities and verbs, at least on a sentence level, based on a semantic analysis of the verbs;
determine at least one of: a topic, and a sentiment associated to the verbs identified in said textual documents or to sentences associated with said verbs;
use the identified relationship between entities and verbs and a respective determined topic or sentiment associated with the verbs, to determine for each of the plurality of entities: a sentiment level associated thereto, and a level of activity at the at least one topic associated thereto; and
apply a probabilistic model of the topics presented in the textual documents while using the identified relationship between entities and verbs and a respective determined topic or sentiment associated with the verbs to determine for each of the plurality of entities: a sentiment level associated thereto, and a level of activity at the at least one topic associated thereto, taking into account a probability of each of the topic in a respective sentence,
wherein the probabilistic model at the sentence level is based on an approximated probability of for each of the topics occurring in each of the sentences, calculated based on a probability of each of the topics occurring in each of the textual documents and a probability of a word occurring in each of the topics, and
wherein the level of activity for each entity in the at least one topic is calculated as a sum of the approximated proportions of all of the topics in all of the sentences in the textual documents using, whenever the entity is tagged as active.

15. A non-transitory computer readable medium comprising a set of instructions that when executed cause at least one processor to:
obtain a plurality of textual documents describing a plurality of entities; and
identify a relationship between entities and verbs, at least on a sentence level, based on a semantic analysis of the verbs;
determine at least one of: a topic, and a sentiment associated to the verbs identified in said textual documents or to sentences associated with said verbs;
use the identified relationship between entities and verbs and a respective determined topic or sentiment associated with the verbs, to determine for each of the plurality of entities: a sentiment level associated thereto, and a level of activity at the at least one topic associated thereto; and
apply a probabilistic model of the topics presented in the textual documents while using the identified relationship between entities and verbs and a respective determined topic or sentiment associated with the verbs to determine for each of the plurality of entities: a sentiment level associated thereto, and a level of activity at the at least one topic associated thereto, taking into account a probability of each of the topic in a respective sentence, wherein the probabilistic model at the sentence level is based on:

$$P'_{k,s} = \theta_{k,d} * \sum_{w \text{ in } s} \varphi_{k,w}$$

wherein $P'_{k,s}$ represents an approximated probability of each topic k occurring in sentence s, wherein $\theta_{k,d}$ denotes probability of topic k occurring in document d and wherein $\phi_{k,w}$ denotes a probability of word w occurring in topic k, and
wherein an Active Actor in Topic (AAIT) score is calculated for each entity e in topic k ($AAIT_{k,e}$) as a sum of the approximated proportions of topic k in all sentences in the document d using, where the entity was tagged as active so that an $A_{e,s}$ indicator equals to 1 and $AAIT_{k,e} = \Sum_{s \text{ in } d} P'_{k,s} * A_{e,s}$.

* * * * *